US008340155B2

(12) United States Patent
Gerhardt et al.

(10) Patent No.: US 8,340,155 B2
(45) Date of Patent: *Dec. 25, 2012

(54) TECHNIQUES FOR GENERATING AND USING A RESERVATION MAP

(75) Inventors: Edward C. Gerhardt, Malabar, FL (US); William F. Bernett, Melbourne, FL (US); William R. Highsmith, Indialantic, FL (US)

(73) Assignee: Investors Life Insurance Corporation, Greenwich, CT (US)

( * ) Notice: Subject to any disclaimer, the term of this patent is extended or adjusted under 35 U.S.C. 154(b) by 508 days.

This patent is subject to a terminal disclaimer.

(21) Appl. No.: 11/687,120

(22) Filed: Mar. 16, 2007

(65) Prior Publication Data

US 2007/0165695 A1    Jul. 19, 2007

Related U.S. Application Data

(63) Continuation-in-part of application No. 10/730,753, filed on Dec. 8, 2003, now Pat. No. 7,457,295.

(60) Provisional application No. 60/784,105, filed on Mar. 20, 2006, provisional application No. 60/432,223, filed on Dec. 10, 2002.

(51) Int. Cl.
*H04B 1/00* (2006.01)

(52) U.S. Cl. .................................................. 375/133

(58) Field of Classification Search ... 375/132–137.224, 375/219, 220, 221, 222, 259, 260; 370/322, 370/342, 343, 341, 395.41, 395.42, 436, 370/437, 468, 477, 352, 356; 455/445, 450, 455/436

See application file for complete search history.

(56) References Cited

U.S. PATENT DOCUMENTS

| 4,578,815 | A |   | 3/1986  | Persinotti     | 455/15   |
| 5,040,238 | A |   | 8/1991  | Comroe et al.  | 455/33   |
| 5,475,677 | A |   | 12/1995 | Arnold et al.  | 370/29   |
| 5,475,866 | A |   | 12/1995 | Ruthenberg     | 455/33.1 |
| 5,901,357 | A |   | 5/1999  | D'Avello et al.| 455/454  |
| 5,999,818 | A |   | 12/1999 | Gilbert et al. | 455/448  |
| 6,088,595 | A | * | 7/2000  | Ciccone et al. | 455/463  |
| 6,301,481 | B1|   | 10/2001 | Para           | 455/450  |
| 6,304,756 | B1|   | 10/2001 | Hebeler et al. | 455/450  |
| 6,324,184 | B1|   | 11/2001 | Hou et al.     | 370/468  |
| 2002/0002052 | A1 | | 1/2002 | McHenry        | 455/447  |

(Continued)

OTHER PUBLICATIONS

Cherubini, Giovanni, *Filtered Multitone Modulation for Very High-Speed Digital Subscriber Lines*, IEEE, vol. 20, No. 5, Jun. 2002, pp. 1016-1028.

(Continued)

*Primary Examiner* — Khanh C Tran
(74) *Attorney, Agent, or Firm* — Feldman Gale, P.A.; Michael C. Cesarano

(57) ABSTRACT

A method of allocation transmission channels of a frequency band to has each of a plurality of remote stations monitor all channels of the frequency band in its area for the presence of transmissions from stations not part of the network. Each remote station transmits its clear channel list to a master station that aggregates the clear channel list into a reservation map, or map of channels that are clear to all stations in the network. The master station then transmits the reservation map to all stations of the network. The individual stations use the channels of the reservation map to transmit information to the master station. Preferably transmission is accomplished using frequency hopping using a set of channels selected from the reservation map.

3 Claims, 10 Drawing Sheets

U.S. PATENT DOCUMENTS

| | | | |
|---|---|---|---|
| 2002/0085503 A1 | 7/2002 | Hulyalkar et al. | 370/252 |
| 2002/0136268 A1* | 9/2002 | Gan et al. | 375/133 |
| 2003/0050012 A1 | 3/2003 | Black et al. | 455/62 |
| 2003/0181213 A1 | 9/2003 | Sugar et al. | 455/454 |
| 2004/0047324 A1 | 3/2004 | Diener | 370/338 |
| 2004/0077366 A1 | 4/2004 | Panasik et al. | 455/514 |

OTHER PUBLICATIONS

Andraka, Ray, *A Survey of CORDIC Algorithms for FPGA Based Computers*, Andraka Consulting Group, 1998, 10 pgs.

Moonen, Marc, *Per Tone Equalization for DMT Receivers*, Globecom, Rio de Janeiro, Brazil, Dec. 1999, 6 pgs.

Zhou, Shengli, *Finite-Alphabet Based Channel Estimation for OFDM and Related Multicarrier Systems*, IEEE, vol. 49, No. 8, Aug. 2001, pp. 1402-1414.

Lee, Donghoon, *A New Symbol Timing Recovery Algorithm for OFDM Systems*, IEEE, 1997, pp. 366-367.

van de Beek, Jan-Jaap, *ML Estimation of Time and Frequency Offset in OFDM Systems*, IEEE, vol. 45, No. 7, Jul. 1997, pp. 1800-1805.

Wyglinski, Alexander M., *Adaptive Filterbank Multicarrier Wireless Systems for Indoor Environments*, Proc. 56$^{th}$ IEEE Vehicular Tech Conf, (Vancouver, BC), Sep. 2002, pp. 336-340.

Saulnier, Gary J., *Performance of an OFDM Spread Spectrum Communications System Using Lapped Transforms*, IEEE, 1997, 5 pgs.

Ohm, Michael, *Extended Lapped Transforms for Digital Multicarrier Modulation*, Globecom, IEEE 25-29, Nov. 2001, pp. 217-221.

Saulnier, Gary J. *Performance of a Spread Spectrum OFDM System in a Dispersive Fading Channel with Interference*, IEEE, 1998, 5 pgs.

Eneman, Koen, *Para-Unitary Filter Bank Design for Oversampled Subband Systems*, Dec. 1997, rev. Jul. 1998, 31 pgs.

Govardhanagiri, Subbarao, *Performance Analysis of Multicarrier Modulation Systems Using Cosine Modulated Filter Banks*, IEEE, 1999, pp. 1405-1408.

*Filtered Multitone Modulation*, IBM Europe, Jul. 1999, 14 pgs.

Schuller, Gerald, *Modulated Filter Bank with Arbitrary System Delay: Efficient Implementations and the Time-Varying Case*, IEEE, vol. 48, No. 3, Mar. 2000, pp. 737-748.

Karp, Tanja, *Modified DFT Filter Banks with Perfect Reconstruction*, IEEE, vol. 46, No. 11, Nov. 1999, pp. 1404-1414.

Heller, Peter, *A General Formulation of Modulated Filter Banks*, IEEE, vol. 47, No. 4, Apr. 1999, pp. 986-1002.

Harteneck, Moritz, *Design of Near Perfect Reconstruction Oversampled Filter Banks for Subband Adaptive Filters*, IEEE, vol. 46, No. 8, Aug. 1999, pp. 1081-1085.

Knapp, Steven, *Using Programmable Logic to Accelerate DSP Functions*, Xilinx, Inc. 1995, pp. 1-8.

Dick, Chris, *FPGA Interpolators Using Polynomial Filters*, 8$^{th}$ International Conference, Sep. 13-16, 1998, 5 pgs.

Barbarossa, Sergio, *Channel-Independent Synchronization of Orthogonal Frequency Division Multiple Access Systems*, IEEE, vol. 20, No. 2, Feb. 2002, pp. 474-486.

Müller, Stefan, *Comparison of Preamble Structures for Burst Frequency Synchronization*, Globecom, San Francisco, CA, Nov. 2000, pp. 1488-1493.

DesBrisay, Greg, *Basics of Orthogonal Frequency Division Multiplexing (OFDM)*, Cisco System, Inc., 2000, pp. 1-42.

Zhou, Shengli, *Digital Multi-Carrier Spread Spectrum Versus Direct Sequence Spread Spectrum for Resistance to Jamming and Multipath*, IEEE, vol. 50, No. 4, Apr. 2002, pp. 643-655.

Classen, Ferdinand, *Frequency Synchronization Algorithms for OFDM Systems Suitable for Communication Over Frequency Selective Fading Channels*, IEEE, 1944, pp. 1655-1659.

Keller, Thomas, *Orthogonal Frequency Division Multiplex Synchronization Techniques for Frequency-Selective Fading Channels*, IEEE, vol. 19, No. 6, Jun. 2001, pp. 999-1008.

Gardner, Floyd, *A BPSX/QPSK Timing-Error Detector for Sampled Receivers*, IEEE, vol. COM-34, No. 5, May 1986, pp. 423-429.

van de Beek, Jan-Jaap, *Low Complex Frame Synchronization in OFDM Systems*, IEEE 1995, pp. 982-986.

Schafhuber, Dieter, *Pulse-Shaping OFDM/BFDM Systems for Time-Varying Channels: ISI/ICI Analysis, Optimal Pulse Design, and Efficient Implementation*, Vienna University of Technology, Sep. 2002, pp. 1012-1016.

Pfletschinger, Stephan, *Optimized Impulses for Multicarrier Offset-QAM*, Globecom, IEEE Nov. 25-29, 2001, vol. 1, pp. 207-211.

Landström, Daniel, *Time and Frequency Offset in OFDM Systems Employing Pulse Shaping*, IEEE, 1997, pp. 278-283.

Vahlin, Anders, *Optimal Finite Duration Pulses for OFDM*, IEEE, vol. 44, No. 1, Jan. 1996, pp. 10-14.

van de Beek, Jan-Jaap, *Synchronization of a TDMA-OFDM Frequency Hopping System*, IEEE 1998, 6 pgs.

Zyren, Jim, *Tutorial on Basic Link Budget Analysis*, Intersil, Jun. 1998, pp. 1-8.

Gardner, Floyd M. *Interpolation in Digital Modems—Part I: Fundamentals*, IEEE, vol. 41, No. 3, Mar. 1993, pp. 501-507.

Erup, Lars, *Interpolation in Digital Modems—Part II: Implementation and Performance*, IEEE, vol. 41, No. 6, Jun. 1993, pp. 998-1008.

Li, Jian, *Carrier Frequency Offset Estimation for OFDM-Based WLANs*, IEEE, vol. 8, No. 3, Mar. 2001, pp. 80-82.

Larsson, Erik G., *Joint Symbol Timing and Channel Estimation for OFDM Based WLANs*, IEEE, vol. 5, No. 8, Aug. 2001, pp. 325-327.

Miaoudakis, Andreas, *An All-Digital Feed-Forward CFO Cancellation Scheme for Hiperlan/2 in Multipath Environment*, IEEE 2002, 5 pgs.

Müller, Stefan H., *Comparison of Preamble Structures for Burst Frequency Synchronization*, Globcom, San Francisco, CA, Nov. 2000, pp. 1488-1493.

Ma, Xiaoli, *Non-Data-Aided Frequency-Offset and Channel Estimation in OFDM and Related Block Transmissions*, IEEE 2001, pp. 1866-1870.

Pompili, Massimiliano, *Channel-Independent Non-Data Aided Synchronization of Generalized Multiuser OFDM*, IEEE 2001, pp. 2341-2344.

Kim, Yun Hee, *An Efficient Frequency Offset Estimator for OFDM Systems and Its Performance Characteristics*, IEEE, vol. 50, No. 5, Sep. 2001, pp. 1307-1312.

van de Beek, Jan-Jaap, *A Time and Frequency Synchronization Scheme for Multiuser OFDM*, IEEE, vol. 17, No. 11, Nov. 1999, pp. 1900-1914.

Tufvesson, Fredrik, *Time and Frequency Synchronization for OFDM using PN-Sequence Preambles*, IEEE Vehicular Technology Conference, Amsterdam, The Netherlands, Sep. 1999, pp. 1-5.

Tufvesson, Fredrik, *Time and Frequency Synchronization for BRAN using PN-Sequence Preambles*, Radio Science and Communication, Karlskrona, Sweden, Jun. 14-17, 1999, pp. 1-5.

Litwin, Louis, *The Principles of OFDM*, RF Signals Processing, Jan. 2001, pp. 30-48.

\* cited by examiner

TECHNIQUES FOR GENERATING AND USING A RESERVATION MAP

CROSS REFERENCE TO RELATED APPLICATIONS

The present application claims priority to U.S. Patent Provisional Application Ser. No. 60/784,105, filed Mar. 20, 2006, by E. Gerhardt et al, entitled: "Link Utilization Mechanism For Aggregation Of Disjoint Radio Bandwidth," the contents of which are incorporated herein in their entirety by reference.

The present application is a continuation-in-part of and claims the benefit of previously filed, co-pending U.S. patent application Ser. No. 10/730,753, filed Dec. 8, 2003, now U.S. Pat. No. 7,457,295 by Brent Saunders et al, entitled: "Radio Communication System Employing Spectral Reuse Transceivers", which claims priority to U.S. Provisional Application Ser. No. 60/432,223, filed Dec. 10, 2002, by Edward Gerardt et al, entitled: "Link Utilization Mechanism for Aggregation of Disjoint Radio Bandwidth," the contents of both of which are incorporated herein in their entirety by reference.

BACKGROUND OF THE INVENTION

1. Field of the Invention

The invention is directed to communication systems and, more particularly to a reservation map for frequency allocation in communication systems with transceivers operating as secondary users in a primary user frequency band.

2. Description of the Prior Art

Some radio spectrum licensees have a plurality of adjacent or disjoint radio channels or combinations thereof to support communication services such as, for example, analog voice services. Typically, user channel allocations will have standard bandwidths of 6.25, 12.5-, 25- or 50-kHz or multiples thereof. One concern of licensees is the efficient utilization of their aggregate bandwidth. In the example of analog push-to-talk voice services, some have chosen to use fixed-frequency or manual channelized radios. While these radios are inexpensive, they may offer poor utilization of the radio channels if they have a dedicated frequency or frequency pair; if the user only uses the radio ten-percent of the time, then ninety-percent of the user channels' bandwidth is wasted.

In another example, frequencies from different primary users are utilized harvested for use on a secondary use basis In the above examples, additional radios could share the frequencies by using a "listen-before-talk" user discipline. This will improve the spectral efficiency but some users may have to wait until the frequency becomes clear or manually adjust the frequency if the radio has that capability and try again. Trunked radios offer an improvement over the mechanisms described above. Trunked radios signal a repeater station and the repeater will select a clear channel for the caller. There are several trunking protocols that can be selected, all of which share a disadvantage also shared by other push-to-talk mechanisms: the channelization of the radios is inflexible and efficiency of band usage may be low.

The radios described above and similar radios are inflexible in that they must be used only on a channel of fixed bandwidth (such as 12.5- or 25-kHz) and must remain on the same frequency throughout the duration of the session, making higher utilization of the bandwidth difficult. In addition, these radios do not easily allow additional services such as Ethernet and IP (Internet Protocol) digital services to co-exist and use the bandwidth when not used by the radios.

Problems of the Prior Art

A class of radios can receive multiple carriers simultaneously. In one example, a point-to-multipoint multicarrier master station radio can receive a data stream spread over the multiple carriers. A common problem in point-to-multipoint networks is how to share the band in the remote-to-master station direction (upstream). Various solutions for sharing the upstream bandwidth ("access method") have been implemented, such as TDMA, Aloha, slotted Aloha, and many others.

All these access methods have some sort of implicit or explicit signaling. TDMA has implicit signaling in the fixed TDMA frame structure. The remote stations use the TDMA clock to identify which slots in the frame are available for each site, based on a slot-numbering scheme and a site-numbering scheme. In one form of slotted Aloha, the master station signals that a message was lost by sending ACK and NAK signals based on message sequence numbers. All such signaling schemes exact a cost on network throughput due to the signaling overhead and the effectiveness of the bandwidth-sharing scheme. The efficiency of the signaling scheme can be affected by many factors, including transit delay (especially satellite or low-speed networks), round-trip signaling delay, raw bandwidth overhead, interaction with higher-layer protocol timers and others. The cost of the sharing scheme comes in the form of some combination of throughput, jitter, delay and other factors.

BRIEF SUMMARY OF THE INVENTION

The present invention is directed to improvements in cognitive radios of the type described in published US Patent Publication No. 2004/0142696 A1, which is the parent of this application and more particularly to techniques for using a reservation map.

In accordance with the present invention, there are a plurality of transceivers operating as a part of a network. One transceiver is designated as the master or the master station transceiver and controls communications with the other transceivers. The stations of the network are designed to operate as secondary users in a frequency band in which primary users have been allocated priority access to the frequency spectrum. Disjoint bandwidth assigned to a primary user can be aggregated or bandwidth assigned to multiple primary users can be harvested for secondary use. The frequency spectrum in use is divided into a plurality of transmission channels which can be utilized in a frequency hopping manner based on interference measurements. Individual remote stations monitor each of the frequency hopping channels for the presence of interfering transmissions from stations not participating in the network. Each remote station identifies transmission frequencies of the bandwidth that are free from interference and can be utilized as perceived from the viewpoint of that remote station. The remote station creates a clear channel assessment map for its surroundings and transmits that to the central or master station. The central or master station is sometimes called a master station. The master station then gathers the clear channel assessment maps from each of the individual remote terminals and creates a master clear channel assessment map which identifies all frequencies that are free for transmission by the transceivers of the network. It then transmits a reservation map identifying those frequencies to all of the stations participating in the network.

In the present invention the network uses a dynamic frequency hopping sequence based on frequencies identified as available in the reservation map. A pseudo-random sequence is used to select clear channels identified in the reservation map. If, for example, the network is using 20 hopping channels simultaneously to achieve the desired bandwidth, it will select twenty of the available hopping channels out of the available (non-busy) hopping channels and transmit in those hopping channels for a dwell period. It will then select another set of twenty available hopping channels out of the available hopping channels and use those during the next dwell period. This process continues until ongoing spectral analysis detects a change to the list of available hopping channels (new interference or formerly busy or blocked hopping channels become available). A new reservation map is sent to reflect the change of circumstances in the spectrum being used. Based on that information new hopping sequences are used in the network, to take into account the changes in interference caused by stations, not within the network, becoming active or inactive.

BRIEF SUMMARY OF THE INVENTION

A preferred embodiment of the invention will now be described with reference to the following figures.

DETAILED DESCRIPTION OF THE INVENTION

Figure 1:
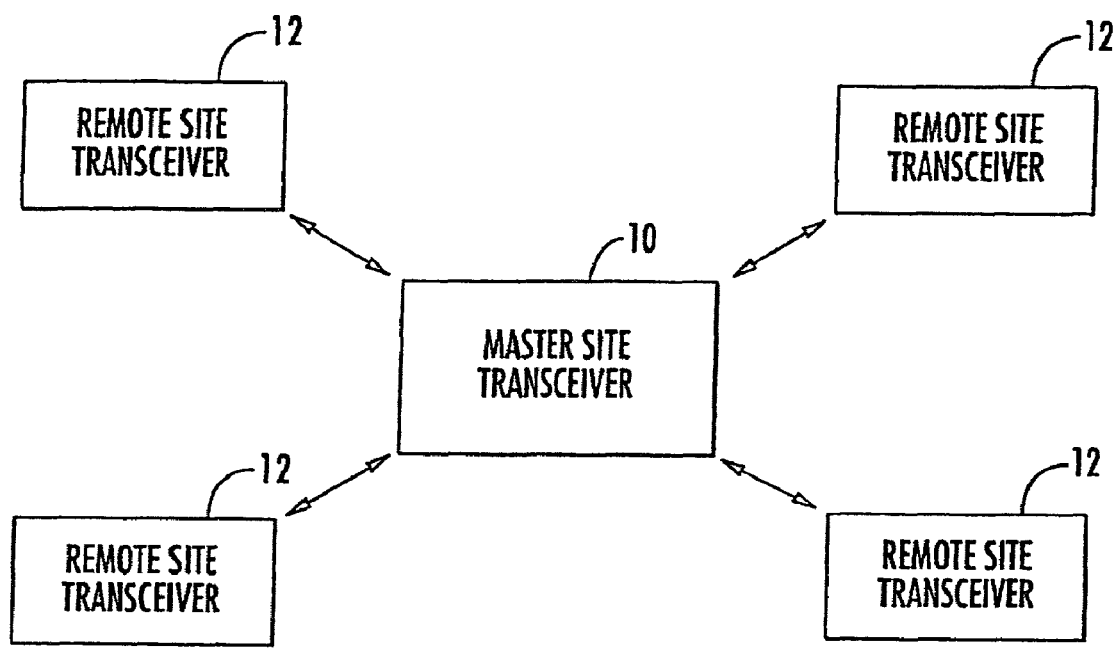
FIG. 1 illustrates a network architecture in accordance with one aspect of the invention.

Before describing in detail the particular improved band utilization and improved interference avoidance mechanisms in accordance with the present invention, it should be observed that the present invention resides primarily in a novel operational situation, namely, aggregation of user channels or harvesting of unused bandwidth in one or more bands and not in the particular detailed configurations thereof. Accordingly, the structure, control and arrangement of these conventional improvements have been illustrated in the drawings by readily understandable diagrams which show only those specific details that are pertinent to the present invention, so as not to obscure the disclosure with structural details which will be readily apparent to those skilled in the art having the benefit of the description herein. Thus, the illustrations of the figures do not necessarily represent the mechanical structural arrangement of the exemplary system, but are primarily intended to illustrate the major structural and functional components of the system in a convenient functional grouping, whereby the present invention may be more readily understood.

FIG. 1 illustrates a network architecture in accordance with one aspect of the invention. As shown in FIG. 1, there is a master site transceiver 10 (also called a master or a master station) and a plurality of remote site transceivers 12 (also called remotes). In the embodiment shown, each remote site transceiver communicates only with the master site transceiver although other network arrangements are reflected in the invention in which remote sites may communicate with the master site through other site transceivers. Additionally, remote sites may communicate among themselves in other non-preferred embodiments of the invention.

Each of the transceivers 10 and 12 illustrated in FIG. 1 use multiple frequencies of a random access discrete address set for signalling sets of supervisory conditions. The particular frequencies utilized for communication using frequency hopping among the multiple frequencies of the random access discrete address set are described more hereinafter.

Figure 2:
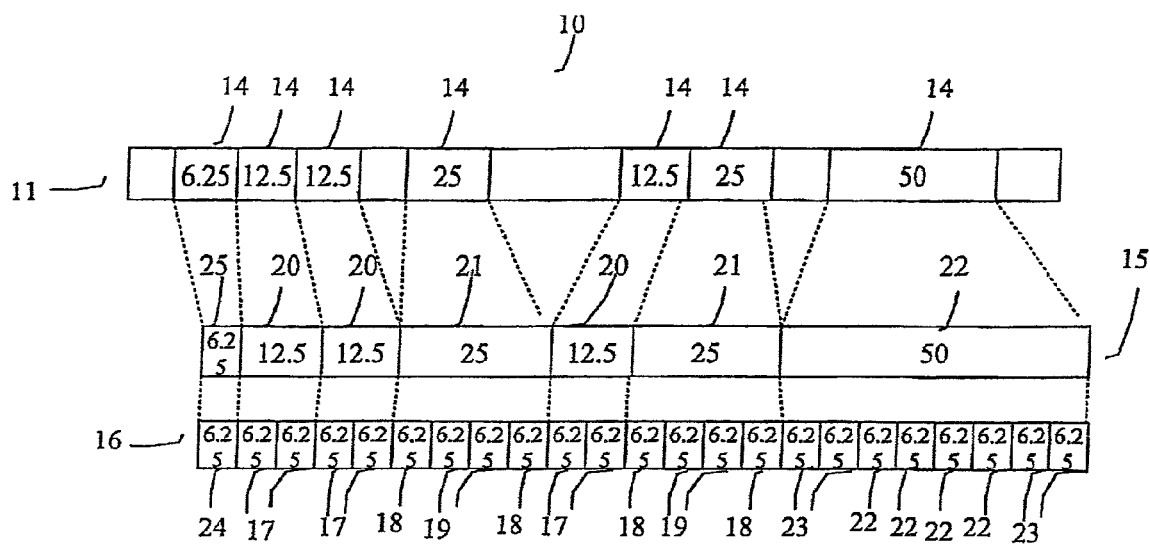
FIG. 2 illustrates mapping of bandwidth associated with a plurality of user channels into a plurality of frequency hopping channels.

Referring now to FIG. 2, a diagram, generally indicated by 10, illustrates an exemplary overlaying of an aggregation of user channels with 6.25 kHz hopping channels. A radio band, generally indicated by 11, has a plurality of allocated user channels 14 to one or more licensees. (This differentiates herein allocated "user channels" from "hopping channels"; "hopping channels" are the overlay frequency hopping channels that a frequency hopping radio uses.) User channels 14 may include a mixture of bandwidths; in the non-limiting example of FIG. 2, the allocation of user channels includes 6.25, 12.5-, 25- and 50-kHz channels 14.

User channels 14 may be viewed as a channel space or aggregation, generally indicated by 15, comprising user channels 14 allocated to the licensee. Aggregation 15 may be viewed as a 6.25 kHz overlay, generally indicated by 16, wherein each 6.25 kHz user channel 25 is comprised of one 6.25 kHz frequency-hopping channel ("hopping channel") 24 and each 12.5 kHz user channel 20 is comprised of two 6.25 kHz hopping channels 17. Similarly, each 25 kHz user channel 21 in aggregation 15 is comprised of two outer 6.25 kHz hopping channels 18 and two inner 6.25 kHz hopping channels 19. Similarly, each 50 kHz user channel 22 in aggregation 15 is comprised of four outer 6.25 kHz hopping channels 23 and four inner 6.25 kHz hopping channels 22.

The 6.25 kHz overlay 16 represents the set of 6.25 kHz hopping channels over which a radio comprising the present invention will frequency hop. However, the order of channel hopping can be modified from the order shown in the figure to lessen interference to silent receivers.

Aggregating a set of user channel allocations 14 or harvesting unused bandwidth from primary users provides many advantages if a selective frequency hopping radio, such as the present invention, is used rather than conventional fixed-frequency or manually agile radios. A frequency hopping radio can selectively hop over the entire allocation, gaining throughput efficiency due to the advantage of packet multiplexing, as will be understood by one skilled in the radio art. In the non-limiting example of voice applications, conventional analog push-to-talk radios can be blocked from completing a call if the correct type of allocation is not available. For example, if no 25-kHz user channel is available for a 25-kHz radio, the call will be blocked, even if there are two or more 12.5-kHz user channels available. By using a selective frequency-hopping digital radio, the entire pool of user channel allocations in the form of an aggregation 15 will be available to all radios. As will be known to one skilled in the radio art, digital radios can often provide voice, video and data services at adjustable or selectable quality of service and voice or image quality. In addition, spare capacity in the aggregated network may be used for a variety of data services, including Ethernet bridging and IP; this would not be readily available in conventional or trunked analog voice services.

A further advantage of the present invention is the optional application of interference detection to enable sharing of aggregation 15 by a mixture of conventional and digital radios, said digital radios comprising the present invention. While the interference-detection features of the present invention typically are used to avoid interfering with primary licensees or other secondary licensees, in an aggregation 15, the interference-detection features may be used to detect the activity of conventional radios that use user channels within aggregation 15 on an equal basis with other radios in the aggregation. Licensees may be motivated to allow a mixture of analog and digital radios due to the cost of complete equipment replacement; thus, some analog radios can continue to operate without change while the network enjoys the advantages of the present invention, improving spectral efficiency for new installations or replacement radios in a phased replacement program.

It should be noted that a single band is used in the example. However, the present invention anticipates that an aggregation 15 could be comprised of a plurality of bands. In such a case, aggregation 15 would operate in the same manner as a single band. As one skilled in the radio art will understand, a radio must be able to hop in (operate in) all the bands in the aggregation in order to enjoy the advantages of a multi-band aggregation. The present invention also contemplates harvesting unused bandwidth from a plurality of primary users.

It should be noted also that the term band has a wide range of meanings in the radio art. It can refer broadly, for example, to the entire range of UHF frequencies (the UHF band). It can also refer to administrative or regulatory subdivisions of larger bands, such as the 420-450 MHz UHF band or the yet smaller police band within the 420-450 MHz band. The present invention anticipates all these and similar meanings. The aggregations can comprise user channels from the same band; similarly, the aggregations can comprise user channels from a plurality of bands.

Figure 3A:
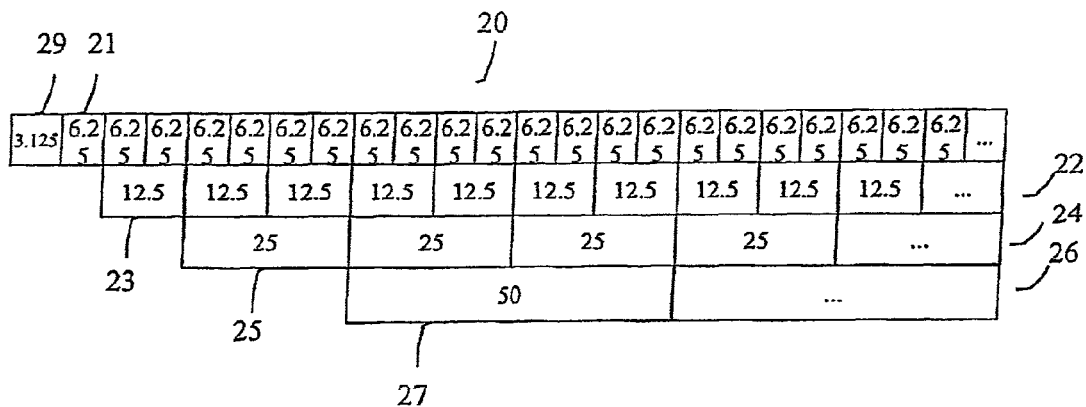
FIG. 3A shows a first band plan in which user channels are overlaid with a plurality of hopping channels in one arrangement.

Referring now to FIG. 3A, a diagram illustrates a band plan, generally indicated by 20, in which 6.25, 12.5, 25 and 50-kHz user channels are overlaid, as might be prescribed by a radio spectrum regulatory agency such as the FCC (Federal Communications Commission). In the diagram, band 20 is comprised of a series of 6.25 kHz user channels 21. Overlaying band 20 is a series of 12.5 kHz user channels 23 in overlay 22. Note that in this example, the edges of 12.5 kHz user channels 23 align with an edge of two 6.25 kHz user channels 21 and the center of 12.5 kHz user channel 23 aligns with an edge of a 6.25 kHz user channel 21. Similarly, 25 kHz user channels 25 of overlay 24 align with an edge of two 12.5 kHz user channels 23. The center of 25 kHz user channel 25 is on an edge of a 12.5 kHz user channel 23. Similarly, 50 kHz user channels 27 of overlay 26 align with an edge of two 25 kHz user channels 25. The center of 50 kHz user channel 27 is on an edge of a 25 kHz user channel 25. Note that overlay 20 has a one-half user channel (3.125 kHz) guard band 29. Overlay 22 similarly has a guard band comprised of one-half of a 12.5 kHz user channel plus guard band 29 (6.25+3.125 kHz). Overlay 23 similarly has a guard band comprised of one-half of a 12.5 kHz user channel plus guard band 29 (6.25+3.125 kHz). Overlay 25 similarly has a guard band comprised of one-half of a 25 kHz user channel plus guard band 29 (12.5+3.125 kHz). Overlay 27 similarly has a guard band comprised of one-half of a 50 kHz user channel plus guard band 29 (25+3.125 kHz).

Figure 3B:
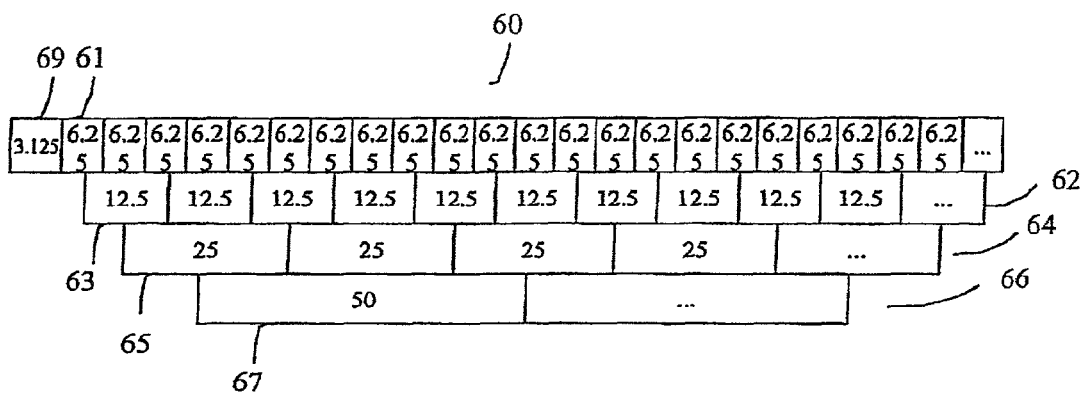
FIG. 3B shows a second band plan in which user channels are overlaid with a plurality of hopping channels in a different arrangement.

Referring now to FIG. 3B, which is similar to FIG. 3A, except that overlay user channels 63, 65 and 67 of FIG. 3B are shifted left 3.125 kHz compared to FIG. 3A. This shift to the left (lower frequency) has the effect, for example, that the left edge of 12.5 kHz user channel 63 is on the center of 6.25 kHz user channel 61, rather than on an edge of 6.25 kHz user channel 61 compared to FIG. 3A.

These band plans are representative of band plans that a radio spectrum regulatory agency such as the FCC might construct for VHF, UHF and other radio bands.

Note that one practical difference between the representative band plans of FIG. 3A and FIG. 3B is that, for example, in FIG. 3A, 25 kHz user channel 25 has two center overlay 6.25 kHz user channels 21 and two outer overlay 6.25 kHz user channels 21; whereas in FIG. 3B, 25 kHz user channel 65 has one center 6.25 kHz user channel 21, two interior 6.25 user channels 21 and two half 6.25 kHz (3.125 kHz) outer user channels.

It will be shown below that this has some impact on selecting a hopping sequence to minimize interference to conventional or trunked radios in an aggregation or bandwidth used for harvesting since use of 6.25 kHz overlay user channels 21 and 61 in the center of a 25 kHz user channel 25 or 65, for example, has a greater interference effect than an outer overlay user channel 21 or 61, as will be understood by one skilled in the radio art.

Figure 4:
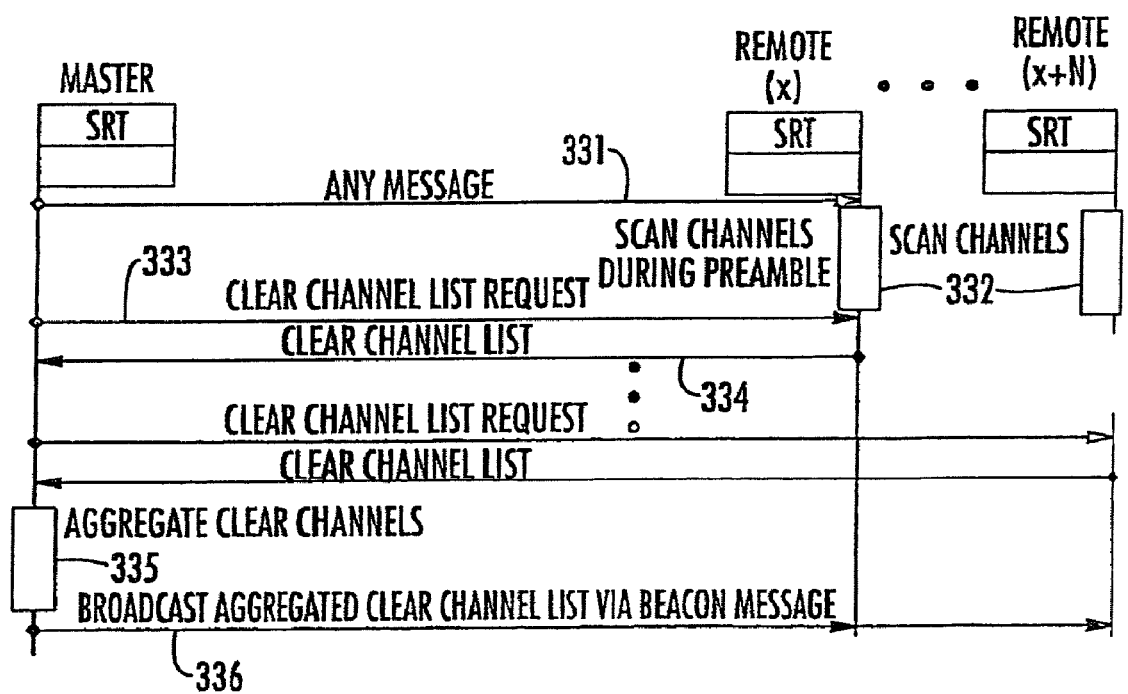
FIG. 4 is a timing diagram showing how a clear channel list is generated.

FIG. 4 is a timing diagram showing how a clear channel list is generated.

Clear channel assessment is performed at both the master site and at each of the remote sites. Each remote site transmits information about clear channels that it senses in its area and transmits that information to the master site. The master site aggregates the information from each of the remote sites into a master clear channel list which identifies clear channels available at all sites throughout the network. The master list of clear channels is maintained at the master site and is transmitted to all remote sites in the network using a reservation map. By transmitting only on a clear channel, a respective site is insured that it will not interfere with any primary user of the spectrum of interest.

FIG. 4 is a sequence diagram of one methodology through which the master site maintains and distributes this aggregate list of clear channels to all the remote sites in the network. When not transmitting a message to the master, each remote user is sequentially stepping through and monitoring its current list of clear channels (that it has previously obtained from the master unit), in accordance with a pseudo random hopping sequence known a priori by all the users of the network from a message that may be transmitted to it by the master site transceiver.

During the preamble period of any message being transmitted by the master at step 331, each remote transceiver scans all 480-6.25 KHz frequency bins within the 217-220 MHz spectrum for the presence of energy at step 332. Any bin containing energy above a prescribed threshold is masked as a non-clear channel, while the remaining ones of the 480 possible channels are marked as clear channels. Similarly, the master checks for clear channels when a remote station is transmitting a preamble.

In one embodiment, with each remote site transceiver having generated a clear channel list as a result of preamble scanning step 332, the master transceiver then sequentially interrogates each remote in the network for its clear channel list via a clear channel request message in step 333. In response to receiving a clear channel request message, a respective remote site transceiver transmits back to the master channel at step 334 the clear channel list it obtained during the preamble portion of the master's message. The master site transceiver continues to sequentially interrogate each of the remote site transceivers, via subsequent clear channel list requests, until it has completed interrogation of the last remote site.

In another embodiment, a remote station reports new interference any time the remote is given a chance to transmit. Preferably this will occur when the remote has a chance to transmit using a single carrier transmission (which occurs from time to time) since the hopping sequence is suspect.

In step 335, the master site transceiver logically combines all of the clear channel lists from all the interrogated remote transceivers to produce an 'aggregate' clear channel list. This aggregate clear channel list is stored in the master transceiver and broadcast in step 336 to all of the remote transceivers. The aggregate clear channel list is broadcast to the remotes using a single carrier transmission since the hopping sequence is suspect. An initialization (beacon) message is transmitted on a single carrier. As the aggregate clear channel list is received at a respective remote site transceiver it is stored in memory.

Any type of message may be sent using a single carrier transmission.

Figure 5:
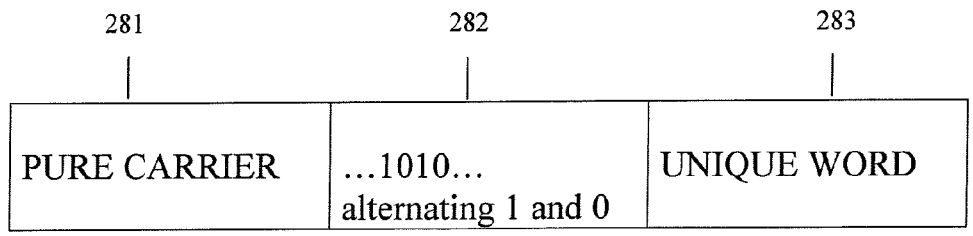
FIG. 5 shows how a beacon preamble message is organized.

FIG. 5 shows how beacon preamble messages are organized.

As noted above, in accordance with the present invention, all actions, including the assembly of the communication network itself, are initiated by the master site transceiver. When the master site transceiver first comes up, it is the only member of the network. An initial task of the master is to determine whether there are any remote sites who wish to join the network, and then grant permission and enable such remote sites to become active network participants, thereby assembling the network for its intended use (e.g., telemetry from a plurality of transducer sites). Once one or more remote site transceivers have joined the network, the master may transmit messages to those remote sites, and may grant permission to the remote sites to transmit messages back to the master site. To this end, the master site employs the four message formats shown in FIGS. 5-8.

More particularly, FIG. 5 shows the contents of a 'beacon preamble' burst, that is periodically transmitted by the master for the purpose of stimulating a response from any remote site who wishes to join the network. To this end, the beacon preamble comprises a single carrier burst, a first portion 281 of which is pure carrier on a frequency, which the master has determined after a scan of the spectrum of interest to be a clear channel. This clear channel carrier portion 281 is followed by a field 282 containing an alternating series of 1's and 0's, and terminated by a field 283, that contains a unique word specifically associated with a search for joining the network action. As will be described, in the course of scanning the (480) channels in (3 MHz) band of interest for the presence of activity, and detecting a beacon preamble, a remote site will proceed to transmit back to the master site a response burst containing only the carrier it has detected in the beacon preamble. The use of the carrier (which the master has previously determined to be a clear channel) in the beacon preamble ensures that the response by the remote site will not interfere with another user of the network.

Figure 6:
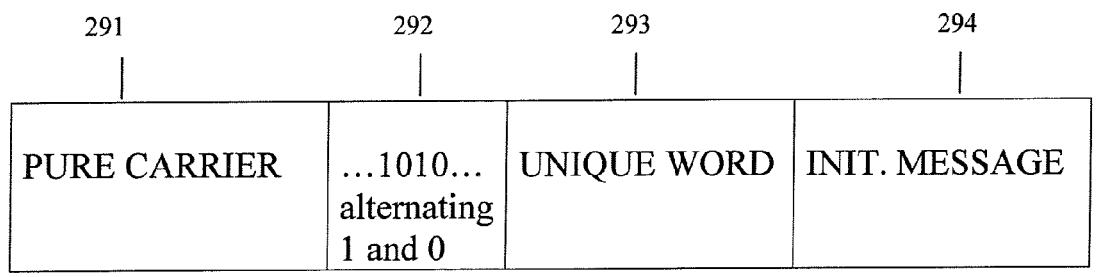
FIG. 6 shows how an initialization burst is organized.

FIG. 6 shows the contents of an initialization burst, which is transmitted by the master site to a remote site who is desirous of joining the network and has successfully responded to the master 'beacon preamble' shown in FIG. 5, described above. Because the remote site has no knowledge of any clear channel other than the channel on which the master's beacon preamble was transmitted, it continues to listen on that channel for a follow-up initialization message from the master site. The follow-up or initialization message of FIG. 6 is a single carrier message (the same clear channel which was detected by the remote site as the beacon of FIG. 5) containing a preamble 291 of pure carrier, which is followed by a field 292 of alternating 1's and 0's, and a unique word field 293, which is different from the unique word field 283. This is followed by a message field 294, which contains prescribed information that enables the remote site to join the network, including the clear channel reservation map, the PN sequence used to hop through the reservation map, the seed for the PN sequence and the preamble channel number. As the remote transceiver is not locked to the master site transceiver, this last item ensures that the remote will properly identify the number of the channel on which it has responded to the master, and thereby enable the remote site to properly use the reservation map for messaging.

Figure 7:
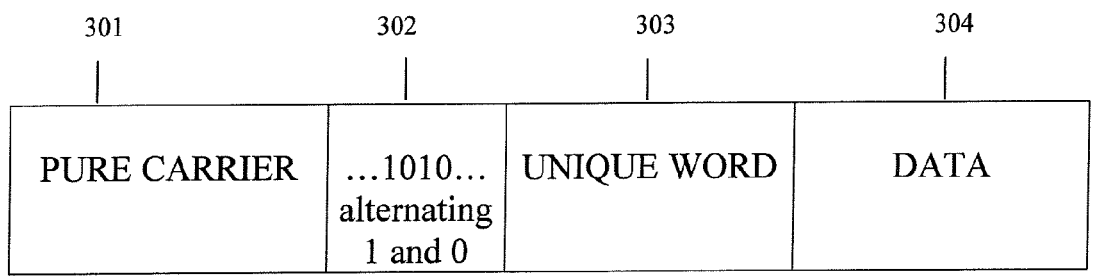
FIG. 7 shows how a data message burst is organized.

FIG. 7 shows the configuration of a standard data message burst used for the transmission of information between a master site and a remote site (other than initialization of the remote site, as described above with reference to FIGS. 5 and 6). In particular, a data message burst contains a single channel preamble, an initial portion 301 of which is pure carrier, followed by an alternating series of 1's and 0's (302), and being terminated by a unique word field 303, that is different from the unique word fields of the message formats of FIGS. 5 and 6. The preamble, which may typically be on the order of several tens (e.g., 48) of symbols, is followed by a multicarrier data field 304 of N symbols in length.

Figure 8:
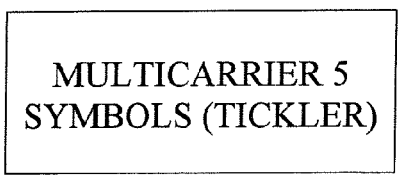
FIG. 8 shows generation of multicarrier ticklers.

FIG. 8 shows at a high level how multi carrier ticklers are formed. Respectively different sets of clear channels are used as tickler tones sets by the master site transceiver to initiate a prescribed response in a remote site transceiver, and by the remote site transceiver to initiate a response in the master site transceiver. In particular, as will be described, the master site transceiver may transmit a 'media open' tickler tone set to indicate that the network is available for the transmission of messages from a remote site transceiver to the master site; an 'access grant' tickler tone set granting access to the network to the first in time, access-requesting remote site transceiver; and a 'master access' tickler tone set to indicate to the network that the master site transceiver is about to broadcast a message. In another embodiment, a remote site transceiver may transmit an 'access request' tone set. This tone set is transmitted by a remote site having data to transmit to the master site transceiver, after the expiration of a random delay period following detection of the media open tickler tone set from the master site transceiver. Tickler tones may be comprised of sets of multiple frequencies (e.g., from three to five frequencies) extracted from the clear channel list and are transmitted simultaneously over a prescribed symbol span, e.g., on the order of four to five symbols.

Figure 9:
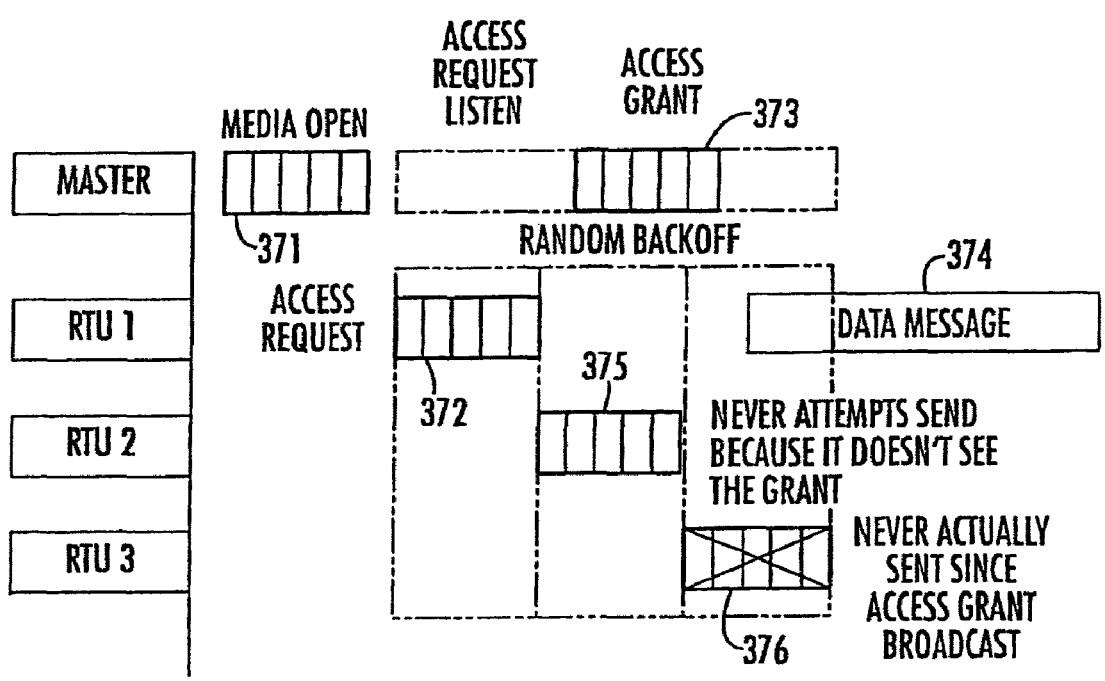
FIG. 9 shows a channel access mechanism utilized in US Patent Application Publication No. 2004/0142696 A1.

FIG. 9 shows an exemplary implementation from the parent application of one form of how channel access is generated.

The communication routine for the case in which the remote site has data to transmit and is awaiting permission from the master site to transmit that data (to the master site transceiver), is now described. In order to indicate that the network media is 'open' for message requests, the master site transceiver transmits a 'media open' tickler 371.

As shown in the contention and backoff diagram of FIG. 9, each remote site transceiver with a pending message awaiting transmission will respond through a random slotted back off, before transmitting an access request. Thereafter, the requesting remote transceiver waits for the master site to transmit an 'access grant' tickler. Once a remote node has been granted access to the channel, the master node listens for a transmission from the remote node for a period of time known as an acquisition of signal (AOS) timeout period.

In the contention and backoff diagram of FIG. 9, it can be seen that remote transceiver RTU2 will not attempt to send a data message, since it will not detect an access grant, as the access grant 373 from the master is transmitted at the same time that remote transceiver RTU2 is transmitting an access request. Remote transceiver RTU3 never attempts to send an access request, because it sees an access grant being transmitted by the master prior to RTU3 initiating an access request, so that RTU3 knows that the access grant from the master site is intended for another remote transceiver.

Where the master site transceiver transmits a data message to a remote site, it transmits a prescribed master access tickler. In response to this tickler, the remote site transceiver transitions to a receive state and receives the message. This is followed by the master site transceiver transmitting a message.

Figure 10:
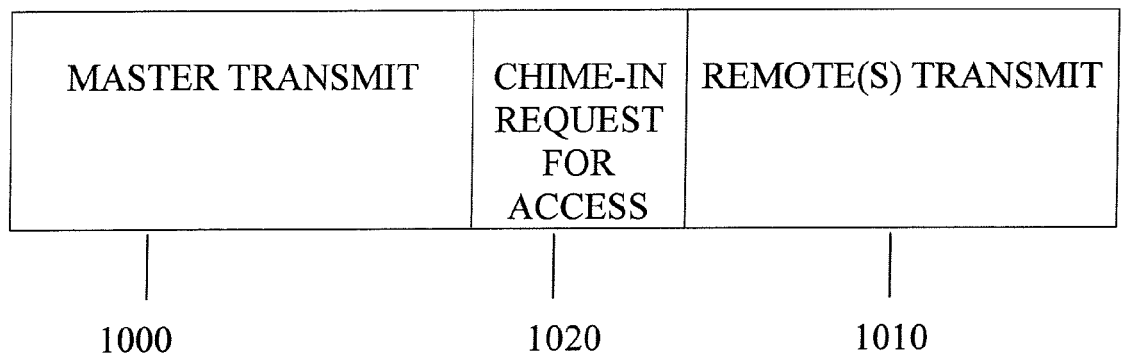
FIG. 10 illustrates a high-level transmission protocol for use in carrying out communications between a master and remote units in accordance with one aspect of the invention.

FIG. 10 illustrates a high level transmission protocol preferred for use in carrying out communications between a master and remote units in accordance with one aspect of the invention. At a high level the protocol for communications includes three components. There is a first portion of a frame in which the master transceiver transmits; that section is designated 1000 in FIG. 10. It is followed by a section of time during which one or more remote stations will transmit (1010) to the master. In between the intervals 1000 and 1010, there is a period 1020 during which chime-in requests for access from the remote terminals can be sent to the master.

Figure 11:
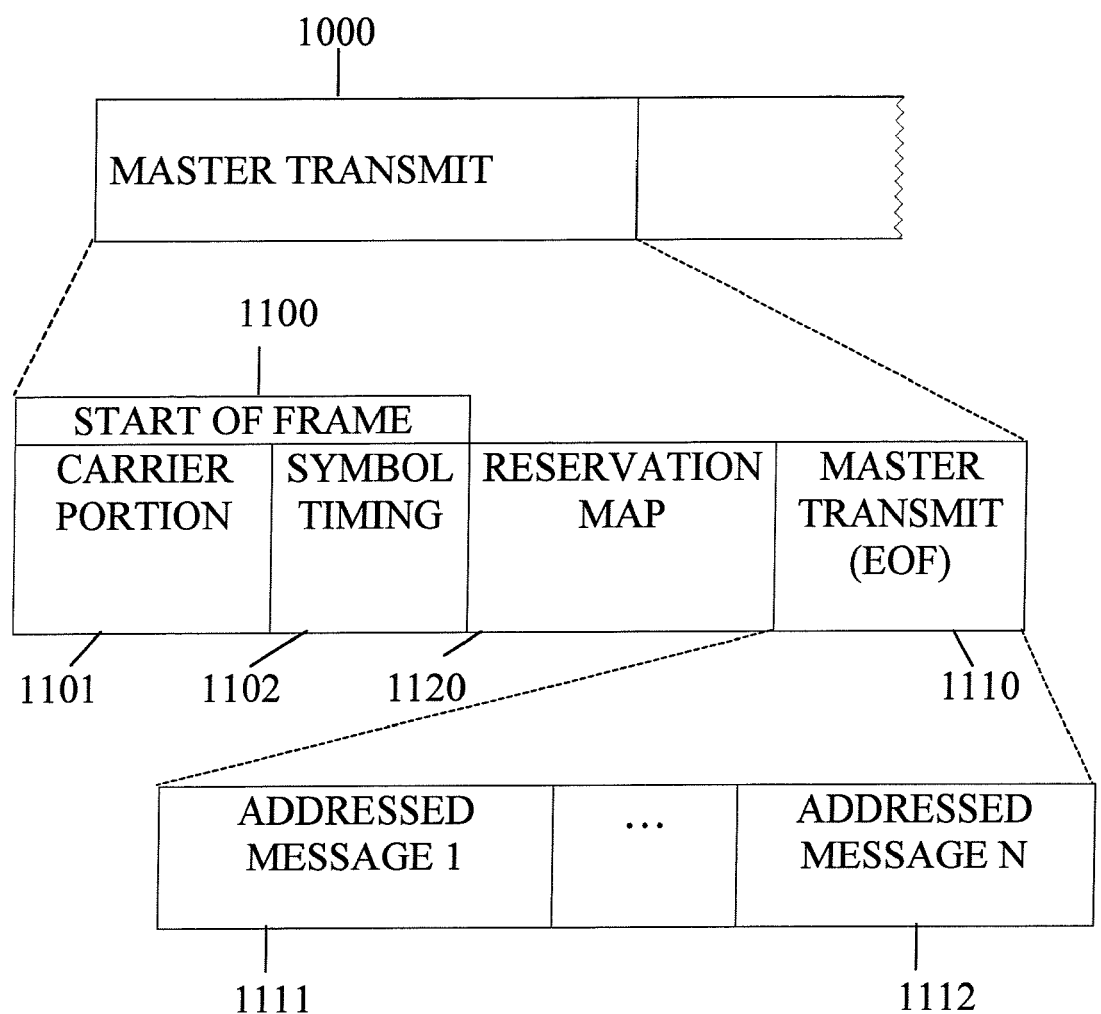
FIG. 11 illustrates the components of the master station transmit portion of the FIG. 10 protocol.

FIG. 11 illustrates the components of the master station transmit portion of the FIG. 10 protocol. The master transmit interval 1000 is comprised of a start of frame component 1100, an reservation map 1120, and a master transmit component 1110. The start of frame component comprises a carrier portion 1101 and a symbol timing recovery portion 1102.

The master station transmit portion 1110 is comprised of one or more addressed messages 1111 and optionally 1112. A master station that may need to transmit to more than one station has the capability to expand the master station transmit interval to accommodate the number of addressed messages that are scheduled for transmission.

The reservation map 1120 contains the clear channel access map that is generated from the individual clear channel access maps transmitted by each remote to the central master station.

Figure 12:
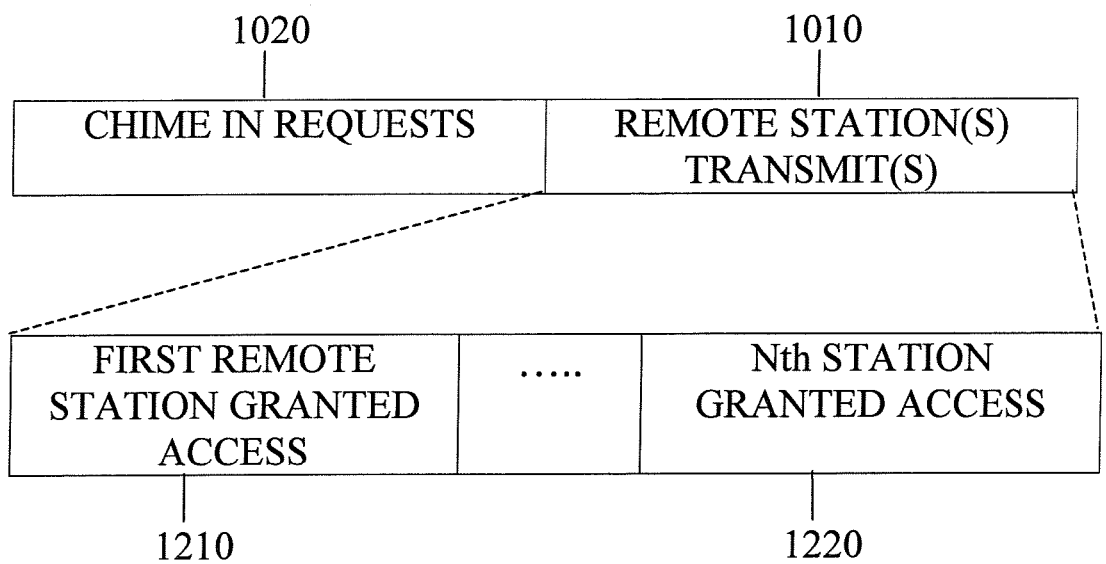
FIG. 12 illustrates the remote transmit portion of the FIG. 10 protocol.

FIG. 12 illustrates the remote station transmit portion of the FIG. 10 protocol. According to a preferred embodiment, in the interval 1010 during which remote stations can transmit, the first remote to be granted access by the master station will transmit its message 1210. In an optional embodiment, the transmission by the first remote will be followed by transmissions from other remote stations which have been granted access 1220.

Figure 13:
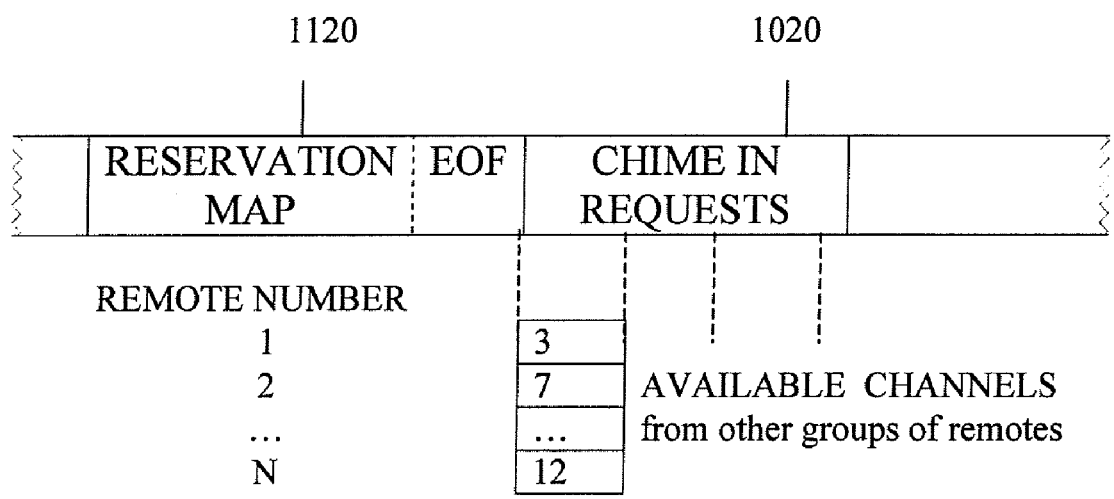
FIG. 13 illustrates how chime-in requests for channel access are generated and how chime-in frequencies are assigned to remote stations in accordance with one aspect of the invention.

FIG. 13 illustrates how chime-in requests for channel access are generated and how chime-in frequencies are assigned to remote stations in accordance with one aspect of the invention. The reservation map 1120, described in conjunction with FIG. 11 either explicitly or implicitly defines the end of frame constituting the period of time during which the master station transmits. Following the end of frame, the chime-in period 1020 begins.

The present invention has very low overhead. Its efficiency comes because it enables all remote stations to signal their need for upstream bandwidth simultaneously during a chime-in period. After a fixed frame period and any time that the master station completes transmitting all remote sites may signal for a brief period simultaneously, each in a designated frequency. The transmission need not contain any information. It can be a simple unmodulated carrier, indicating that the site needs make a transmission. Sites that need not transmit at the moment do not signal. During this brief period, the master station scans all of the carriers simultaneously, noting which sites transmitted. The carriers are the same frequencies used for frequency-hopping data transmissions. The chime-in period can be initiated implicitly by the expiration of time from a master station transmission or explicitly by receipt of a command signal from the master station.

The efficiency of this scheme can be attributed to three factors: the chime-in signaling period can be quite short, on the order of a few milliseconds, for all remote radios in the network to signal; all remote radios signal simultaneously over that short period; and the master station can initiate a signaling period as frequently or infrequently as needed.

In the preferred embodiment, the remote stations use the following mechanism to select their designated signaling carrier frequency: a site's assigned Site ID (assigned by the Network Management System) is used as an index into the current hopping sequence being used. For example, the remote site with Site ID '3' would signal in the third carrier in the present hopping sequence. To further amplify the example, if the hopping sequence happened to be hopping channels 7, 8, 11, 15, 22, 28, . . . and so on, then remote site 3 would use hopping channel 11 (assuming the site IDs started with '1' rather than '0').

As described earlier, in the present invention, the network uses a dynamic hopping sequence based on interference measurements. A pseudo-random sequence is used to select hopping channels in the band that are not busy. If, for example, the network is using 20 hopping channels simultaneously to achieve the desired bandwidth, it will select twenty of the available hopping channels out of the available (non-busy) hopping channels and transmit in those hopping channels for a dwell period. It will then select another set of twenty available hopping channels out of the available hopping channels and use those during the next dwell period. This process continues until the continuing spectral analysis, described earlier, detects a change to the list of available hopping channels (new interference or formerly busy or blocked hopping channel becomes available). After that time, new hopping sequences are used in the network, to take into account the change in interference analysis.

The selection of a signaling channel for a particular site, described earlier is based on the current hopping sequence. If there are more sites than hopping channels in the present sequence (due to the number of simultaneous hopping channels needed or restrictions due to interference), the signaling will, in the preferred embodiment, occur in cycles. For example, if 20 hopping channels are used in the hopping sequence and there are 32 remote sites, sites 1-20 will signal in the first signaling period; in the second signaling period, sites 21-32 will signal. In the preferred embodiment, the master station will signal for cycle 1 of the signaling period, and after that period has ended will signal immediately for cycle 2. By this method, large numbers of sites can signal, adding only a few milliseconds to the signaling period per twenty sites (in the present example).

In the preferred embodiment, the master station uses the following basic process for managing the multiple access method:

a "frame" is dynamic in size (asynchronous); a new frame begins any time that the master station designates one through a signal.

Typically, the master or master station:
transmits one or more messages downstream
sends a start-of-frame signal
the first cycle of remote stations signal for upstream access
as needed, the master station signals for additional cycles of upstream access signaling
the master or master station then selects the next station to transmit from those stations that signaled for upstream access, using a round-robin algorithm for fair access.
in the first transmission from a thus-selected remote site, that site includes a metric of its dynamic need along with the data transmission (which could be user data or management data). In the present embodiment, the master station may, after the first transmission of the presently transmitting site, enable further transmissions according to the metric received or signal for the next site in its list of sites needing upstream bandwidth. The decision to enable another site to transmit before a previous site has exhausted its backlog of data can be based on a variety of network performance criteria well known to one skilled in the art, such as meeting a maximum jitter or delay criteria or meeting an application-determined priority. If a site will have no more data to send after its current transmission, its metric of need will indicate this condition so that the master station may select a new site to transmit.

In the present embodiment, the master station may end the downstream transmission at any time for updates to the reservation map or hopping sequence and/or to transmit downstream data. Afterwards, the master station may begin a new frame (additional signaling) or continue enabling remote stations to transmit based on the previously collected signaling information. This choice will be based on the network performance criteria described above Oitter, delay, priority, etc.). As noted, many criteria will be apparent to one skilled in the art for determining the order in which upstream access is enabled and these are anticipated by the present invention, including simple round-robin schemes and application bandwidth requirements such as packet voice or video.

Thus, use of the reservation map provides substantial flexibility in using channels of a frequency band on a secondary basis while reducing the likelihood of substantial interference to priority users.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. In a network having at least one master station and a plurality of remote stations, a method of allocation of transmission channels of a frequency band, comprising the steps of:
   a. receiving a list of clear channels from each of said plurality of remote stations;
   b. aggregating said lists of clear channels into a reservation map comprising a master list of clear channels that are clear to all stations in said network;
   c. sending said reservation map to said all stations in said network.

2. The method of claim 1, further comprising the step of using selected channels from said reservation map for transmission.

3. A master station for controlling a plurality of remote stations of a network, comprising:
   a. a receiver for receiving lists of clear channels from each of said plurality of remote stations;
   b. a processing element for aggregating said lists of clear channels into a reservation map comprising a master list of clear channels that are clear to all stations in said network; and
   c. a transmitter for sending said reservation map to said all stations in said network.

* * * * *